United States Patent [19]

Murakami et al.

[11] 4,243,690
[45] Jan. 6, 1981

[54] INSTANT-COOKING DRY MACARONI AND LIKE DRY FOODS AND A METHOD OF THEIR MANUFACTURE

[75] Inventors: Sanpei Murakami, Osaka; Sadao Kokeguchi, Ibaragi; Hiroshi Takahashi, Suita; Ken Okada, Osaka, all of Japan

[73] Assignee: Kanebo Foods Ltd., Tokyo, Japan

[21] Appl. No.: 3,934

[22] Filed: Jan. 16, 1979

[30] Foreign Application Priority Data

Jan. 19, 1978 [JP] Japan ................................... 53/4865

[51] Int. Cl.$^3$ ............................................... A23L 1/16
[52] U.S. Cl. .................... 426/557; 426/451; 426/511; 426/242
[58] Field of Search ............... 426/557, 451, 242, 511

[56] References Cited

U.S. PATENT DOCUMENTS

| | | | |
|---|---|---|---|
| 3,537,862 | 11/1970 | Peter et al. | 426/557 |
| 3,718,480 | 2/1973 | Cunningham | 426/557 |
| 3,846,563 | 11/1974 | Tremblay et al. | 426/242 |
| 4,044,165 | 8/1977 | Baumann | 426/557 |

*Primary Examiner*—Joseph M. Golian
*Assistant Examiner*—Elizabeth A. Hatcher
*Attorney, Agent, or Firm*—Cushman, Darby & Cushman

[57] ABSTRACT

Instant-cooking dry macaroni products are manufactured by preparing a raw macaroni or like macaroni type food material containing at least 25% by weight of water by mixing, with substantially no kneading, components consisting mainly of wheat flour and water or additives; then subjecting this mixture to a preliminary steaming at a gauge pressure of 0.5–1.5 kg/cm$^2$ for 2–5 minutes till an α-conversion degree of from 60% to 80% is reached; then shaping the resulting material into individual molded pieces of a desired configuration; thereafter, with or without application of water to the surfaces of the molded pieces so that these surfaces carry water in an amount not exceeding 100% by weight relative to the weight of the molded pieces; then subjecting the molded pieces to a further steaming step at similar pressure and time till an α-conversion degree of at least 90% is attained; and thereafter drying them till the water content of the molded pieces is reduced to at most 10% by weight relative to the weight of the molded pieces thus dried. These dry macaroni products have no portions sticking to each other, have smooth surfaces and have fine porous texture, and are easily transformed to an edible cooked state by immersion in hot water for a short time, and give good sense, feel and taste. Also, these dry foods are stable and have good durability without change in quality during storage for an extended period of time.

20 Claims, 4 Drawing Figures

INSTANT-COOKING DRY MACARONI AND LIKE DRY FOODS AND A METHOD OF THEIR MANUFACTURE

BACKGROUND OF THE INVENTION (a) Field of the Invention

The present invention relates to instant-cooking dry macaroni and like macaroni type food products, and a method of manufacturing such dry foods.

(b) Description of the Prior Art

In the past, macaroni products including spaghetti and vermicelli, have been produced by adding water to starch components consisting mainly of strong wheat flour such as Semolina of the Durum Wheat family, uniformly distributing the added water throughout the starch components by kneading the mixture, and thereafter by subjecting the kneaded mixture to extrusion under pressure to shape the material into individual pieces of macaroni products of a desired shape, and then drying them for a substantially long period of time such as 24 hours. Such macaroni products have been widely sold in the market.

However, these well known foods are not given an $\alpha$-conversion treatment during their manufacturing process. Accordingly, in case these foods are to be eaten, they must be boiled for a substantial length of time for the purpose of cooking before being served. Thus, these known products are not of the type that they can be instantly cooked or transformed into an edible state before being served.

As for those macaroni products which are placed on the market as being instantly cookable foods, there are known those macaroni products which are produced by first subjecting raw macaroni pieces to a boiling treatment for $\alpha$-conversion of the starch components, and by packing the boiled macaroni pieces with a heat-resistant film or like wrapping sheet, and thereafter subjecting the packed macaroni to a heating-and-pasteurizing step. Also there are known those macaroni products which are produced by a manufacturing process similar to that stated above excepting that the packed macaroni is subjected to a freezing step at a temperature of about $-30°$ C.

These known instant-cooking macaroni products which have been subjected to a heating-and-pasteurizing step during their manufacturing process can be instantaneously cooked and served only by heating them in hot water or through like heating means. However, because these macaroni products have a fairly high content of water, there is the disadvantage that the $\alpha$-converted starch components are subjected to $\beta$-conversion during storage, and that, thus, when the instantly cooked macaroni are served, they give to the person who eats them a sense, feel and taste as if the cooked macaroni are not sufficiently boiled and feel like raw wheat flour, which is caused by $\beta$-conversion which arises during the storage. Thus, these known instant-cooking products macaroni are poor in sense, feel and taste when eaten, and in addition thereto, when these known macaroni products are stored for more than a week at room temperature, there tends to develop mold on the product, and accordingly they cannot be termed as being stable during storage for an extended period of time.

On the other hand, those products having been given a freezing treatment are superior to those having been subjected to heating-and-pasteurizing treatment with respect to stability of quality during storage for an extended period of time. However, these frozen products require the additional troublesome step of passing boiled macaroni through a low-temperature zone, and what is more, these frozen macaroni products have the further disadvantage that, as with the heated-and-pasteurized macaroni, the once $\alpha$-converted starch components are $\beta$-converted during the period in which the macaroni products are de-frozen before being served, and that thus they give similar raw wheat flour-like sense, feel and taste when the instantly cooked macaroni are eaten.

Also, as stated in U.S. Pat. No. 3,537,862, there is known a method of obtaining $\alpha$-converted pasta by mixing wheat flour and/or other grain powder with water, followed by extruding the mixture directly through a die to form a pasta, and then steaming this pasta at an appropriate temperature while applying hot water thereto, and thereafter drying same. This known method is able to reduce the time required for drying, as viewed from the aspect of manufacture alone, since the pasta is subjected to steaming. Also, this method is able to eliminate the development of muddiness of the surfaces of the product which, otherwise, would be caused by the exudation of those starch components which takes place when the pasta is boiled for being served to a consumer. However, the product obtained according to this known method requires that the product be boiled to elevate $\alpha$-conversion in order to serve to the consumer for being eaten, and thus this product cannot be rendered to an edible state during a very short period of time by immersion in hot water. If, however, it is intended to elevate the $\alpha$-conversion degree of the pasta to solve such inconvenience as stated above, there will arise portions of adjacent products sticking to each other and also there will arise deformation of the products during steaming of the pasta, resulting in noneven $\alpha$-conversion. As a result, such a product will not transform uniformly to an edible state when immersed in hot water, and accordingly will fail to give the consumer a good sense, feel and taste. As such, this known method is unable to attain the object of the present invention.

Furthermore, there is known a manufacturing method of obtaining $\alpha$-converted pasta by mixing, without heating, wheat flour and water, and extruding the resulting mixture dough under a high temperature and high pressure, and thereafter drying same, as stated in U.S. Pat. No. 4,044,165.

However, this known method carries out extrusion of material at a high temperature in order to enhance the degree of $\alpha$-conversion of the product. Accordingly, boiling of water will occur in the material during the extrusion, and thus there is the fear that an expansion of the material can take place. If, therefore, the amount of the water added is decreased at the time of mixing to prevent the occurrence of this expansion, this will be accompanied by a shortage of water in the mixture which is necessary for effecting $\alpha$-conversion, leading to the result that the degree of $\alpha$-conversion of the extruded product becomes low, and this, in turn, will give to the consumer a feeling like raw wheat flour even when the product is transformed to edible state by immersion in hot water. Thus, the product obtained according to this known method has the disadvantage represented by a loss of good sense, feel and taste. As such, this prior art procedure is unable to attain the object of the present invention.

These known products labeled as instant-cooking macaroni products generally further have the disadvantage that when hot water is poured onto the macaroni product, they tend to cause the hot water to become turbid and unclear due to partial exuding or dissolving of starch components in the hot water, resulting in a loss of good shape of the individual pieces of macaroni as well as a loss of sense, feel and taste, and that in some cases the macaroni pieces immersed in hot water tend to stick to each other locally.

As stated, the known instant-cooking macaroni products have those various disadvantages and inconveniences as stated above which are required to be improved.

The present inventors, therefore, have conducted research and many experiments to resolve the foregoing problems encountered in the prior art, and as a result they have arrived at the present invention based on the discovery that, by first forming a granular mixture of grain flour consisting mainly of wheat flour, especially of Semolina flour of the Durum Wheat family, while avoiding as much as possible causing the mixture to become kneaded during the mixing step, and at the same time adjusting the water content of the mixture so as to be 25 to 35% by weight relative to the weight of the starch components of the mixture, and continuing this mixing until the granules of the mixed material are distributed evenly throughout the body of the mixture. Thereafter the mixture is subjected to a preliminary steaming to bring about an α-conversion degree of the starch components of the mixture from 60% to 80%, and that whereby the reticulate structure of the protein, i.e. gluten, contained in the mixture is caused to become fixed as this gluten progressively undergoes denaturalization due to the application of heat during the steaming step, resulting in those parts of the starch componets which have become like glue are enclosed in the reticulate structure and are inhibited from exuding to adhere to the surface of the mixture, which means that the surfaces of the subsequently molded macaroni products will become free from becoming sticky.

The present inventors have found also that this reticulate structure of gluten contributes to the formation of a product texture having an appropriate degree of viscosity and resiliency of the molded macaroni pieces, so that when the material is appropriately shaped into individual molded pieces by means of, for example, an extruder, there occurs no development of phenomenon such as the surfaces of the individual molded pieces of macaroni will locally stick to each other and that the configuration of the molded pieces will become deformed, which have been encountered in conventional such foods, and which have been caused in the prior art foods due to excessive α-conversion during the boiling step in the manufacturing process.

The present inventors have found further that, through their process, there can be obtained molded products of individual macaroni pieces which are uniform in configuration relative to each other and which do not develop muddiness on the surfaces of the individual molded pieces and which are free of stickiness between contacting portions of these molded pieces.

The present inventors have also found that, even when the surfaces of the molded pieces which have been preliminarily steamed for an α-conversion degree of from 60 to 80% are contacted with water and when these water-carrying pieces of the material are subjected to further steaming till an α-conversion of the starch components of at least 90% is reached, in order to enhance the ability of these molded pieces to be instantaneously rendered to an edible cooked state, there arises no occurrence of exudation of the remaining starch components which are of a glue-like nature during this further steaming, and that accordingly there develops no sticking between portions of the individual molded pieces and there develops no deformation of these pieces, and that uniform α-conversion is established. This means that the material does not stick onto the surfaces the molding apparatus, and that uniform molded pieces can be obtained.

By drying the resulting molded pieces of material, the dried pieces will possess a fine porous structure having a pore diameter of 5.0–20.0 micrometers, which structure enables them to be transformed very quickly to an edible cooked state by immersion in hot water of 85° C. or higher for 5 minutes or less. Thus, there are obtained instant-cooking dry macaroni and like macaroni products which exhibit good sense, feel and taste when eaten, and which are excellent in their stable duration when stored for an extended period of time of over one year.

SUMMARY OF THE INVENTION

It is, therefore, a primary object of the present invention to provide instant-cooking dry macaroni and like macaroni type products and a method of their manufacture which solve the disadvantages, inconveniences and problems mentioned above of the prior art foods and which eliminate the occurrence of sticking between shaped individual pieces and the occurrence of deformation of these pieces during the manufacturing process.

Another object of the present invention is to provide instant-cooking dry macaroni and like macaroni type products and a method for their manufacture as described above, which foods are uniform in individual configuration and have smooth surfaces.

Still another object of the present invention is to provide instant-cooking dry macaroni products and a method of their manufacture as described above, which foods are capable of being transformed quickly to an edible cooked state by immersion in hot water, and which edible foods exhibit a satisfactory sense, feel and taste when eaten.

A further object of the present invention is to provide instant-cooking dry macaroni products and a method of their manufacture as described above, which foods have stable durability when stored for an extended period of time without deterioration of the quality of the product dry foods.

A still further object of the present invention is to provide a method of manufacturing instant-cooking dry macaroni products, comprising the steps of forming a throughly distributed granular mixture of starch components consisting mainly of wheat flour and water and having a water content of 25–35% by weight relative to the weight of the starch components, while avoiding as much as possible kneading of the mixture during the mixing, thereafter subjecting this mixture to a preliminary steaming step until the starch components attain an α-conversion degree of from 60% to 80%, followed by molding the resulting mixture into pieces of the desired product configuration, and then with or without application of water onto the surfaces of the molded pieces, subjecting them to further steaming, and then drying same.

DETAILED DESCRIPTION OF THE PREFERRED EMBODIMENTS

Figure 1:
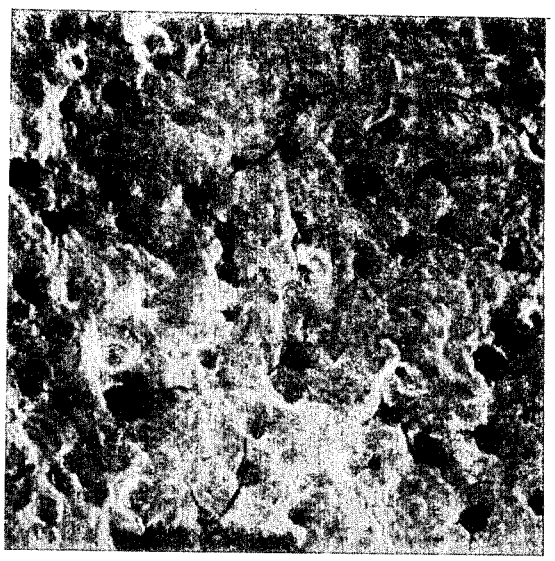
FIGS. 1 and 2 are electron microscopic photographs (magnification: 300 times) showing the external surface and cross section, respectively, of the instant-cooking dry macaroni piece of the present invention obtained in Example 1.

It should be understood that the product pieces of macaroni obtained according to the present invention each has a tubular configuration and has an outer diameter of 0.11–0.27 inch; likewise the pieces of spaghetti obtained according to the present invention each has either a cord-like or tubular configuration and has a diameter of 0.06–0.11 inch; and vermicelli obtained according to the present invention has a cord-like configuration and has a diameter of 0.06 inch or smaller.

It should be understood that the samples of dried product pieces of macaroni products for use in the test to determine the occurrence of sticking between individual product pieces are each comprised of 100 g of product, i.e. about 200 pieces of product, each being about 20 mm in length.

It should be understood also that the degree of $\alpha$-conversion as referred to in this specification relates to the value obtained by measurement with the diastase enzyme process.

The starting mixed material which is employed in the present invention is prepared with starch components consisting of either wheat flour alone or mainly of wheat flour and other grain powders such as rice powder, buckwheat powder, corn powder and so forth and starches such as corn starch, potato starch, waxy corn starch, tapioca starch and so forth, and water, and this mixed starting material has a water content of 25–35% by weight, preferably 27–32% by weight, relative to the weight of the starch components. The component powder or powders are mixed with water into granular mixture while avoiding as much as possible the occurrence that the material is caused to become kneaded during the mixing. Depending on the requirement, the starting mixed material may contain a known improving agent for macaroni products as di-sodium phosphate, or a food additive such as glycerin monostearate. This starting raw material may contain, uniformly dispersed therein, sodium chloride in an amount up to 8.0% by weight relative to the weight of the starch components being subjected to steaming. This sodium chloride is included for the following two purposes, one of which is for improving the ability of the dry macaroni products to transform quickly to the edible boiled or cooked state when immersed in hot water, and the other is for giving a taste to the macaroni. In case the content of sodium chloride is in excess of 8.0% by weight, the macaroni products will become too salty and unacceptable in terms of quality, and also the gluten structure of the macaroni material will be severed apart, making it difficult to form a shaped body of macaroni material.

In case said water content of the starting mixed material is less than 25% by weight relative to the weight of the starch components contained in the mixture, the distribution of both water and air in the material becomes non-uniform, and accordingly the viscosity of the constituent substances becomes markedly lowered, whereby the material is rendered to a powdery state. Thus, it becomes impossible to obtain uniformly shaped molded pieces at the time of the molding or shaping step. Also, in the subsequent further steaming stage which will be described later, there will not develop uniform swelling as the $\alpha$-conversion of the starch components progresses, so that blister-like bubble formation will develop in the surfaces of the molded material, causing the surfaces to lack smoothness. As a result, the final dry macaroni products will develop, when immersed in hot water, scraping and cracking of the body of the macaroni, thus lowering the sense, feel and taste of the macaroni when rendered to the edible state. Also, in case the water content of the starting mixed material is in excess of 35% by weight, the material becomes undesirably muddy, so that the $\alpha$-conversion undergoes an excessive progress, i.e. the reticulate structure of gluten in the mixture becomes excessively fixed, causing the texture of the material to become a dense, dumpling-like state. This state of material will not give rise to uniform $\alpha$-conversion during the subsequent preliminary steaming step, and accordingly during the following molding step, there will take place sticking between the molded pieces of macaroni, and along with this, the fixation of said reticulate structure will be further accelerated, causing the texture to become even more dense, and along therewith, the individual pieces of macaroni will not exhibit a uniform porous structure during the drying step. What is more, the dry macaroni, when immersed in hot water, will not be easily rendered to the edible cooked state when being served. As such, the macaroni after being transformed to the edible state will not give satisfactory sense, feel and taste when eaten.

The starting mixed material may be added with a viscous binder such as egg yolk or a gum component as an additive intended for increasing the viscosity of the components contained in the material. Such an additive has the effect of preventing the occurrence of blister-like bubble formations on the surfaces of the material during steaming.

It should be understood that said improving agent for macaroni products concurrently serving as a food additive which is employed in the present invention is one selected from the group consisting of di-sodium phosphate; glycerin monostearate; a surface active agent including glycerin fatty acid ester, sucrose fatty acid ester, sorbitan fatty acid ester and lecithin; a moistening agent including propylene glycol and D-sorbitol; and other agents including sodium starch phosphate, sodium caseinate, L-lysine hydrochloride, vitamin $B_1$, vitamin $B_2$, chlorella and active gluten. Said viscous binder is one selected from the group consisting of egg yolk and a water-soluble gum including cellulose sodium glycolate, sodium polyacrylate and sodium alginate. Said seasoning agent includes various spices, various extracts, sodium glutaminate, sodium inosinate, guanylic acid and succinic acid.

Next, the manufacturing process according to the present invention will be described in detail.

As a first step, the aforesaid mixed starting material is subjected to a preliminary steaming step to effect $\alpha$-conversion of the starch components contained therein up to a degree of at least 60%, preferably 70–80% at most, and thereafter the resulting mixture is molded into individual macaroni of the desired shape.

In order that this preliminary steaming be performed uniformly, it is desirable to render the mixture to a granular or pellet state by the use of an oscillator or like means, and thereafter to distribute the granular constituents uniformly throughout the starting material, before being subjected to the preliminary steaming.

It should be noted that, in case the degree of α-conversion of the starch components is less than 60%, this is not desirable because it may not be possible to obtain, during the subsequent molding step, molded pieces of macaroni having a uniform configuration.

For the purpose of preliminary steaming, any known conditions for steaming conventional macaroni or like food material may be employed. However, it is desirable to bring the mixed material into contact with steam under a gauge pressure of 0.5–1.5 kg/cm$^2$, preferably 0.7–1.2 kg/cm$^2$, for a length of time of about 2–5 minutes. This preliminary steaming is carried out until the starch components have an α-conversion degree of from 60 to 80%.

By performing a preliminary steaming as stated above, there takes place an appropriate fixation of the reticulate structure of gluten as the thermal degeneration of the protein contained in the mixed material makes progress, and whereby the undesirable exudation of those starch components which have been rendered to a glue-like state is inhibited. Along therewith, the resulting material will possess a texture having an appropriate viscosity and resiliency. Therefore, when the resulting material is subsequently molded into individual molded pieces, there will not occur muddiness on the surfaces of the molded pieces, which muddiness is caused by the exudation of the glue-like starch components. Accordingly, it is possible to obtain molded pieces having a uniform configuration and being free from sticking between individual molded pieces. This is one of the features of the present invention.

Molding of the mixed material may be carried out by the use of any known molding apparatus such as an extruder, a cutter designed for these foods having an appropriate cutting edge, and a slit-cutter.

Then, depending on the requirement, water is applied onto the surfaces of the molded and preliminarily steamed pieces, and then these individual molded pieces carrying water on their surfaces are subjected to further steaming to effect a further α-conversion degree of the starch components of these molded pieces up to at least 90%, preferably 95–98%, and thereafter the resulting pieces are subjected to drying, and thus dry macaroni products are obtained.

The optional application of water onto the surfaces of the molded pieces of material is performed so that water is carried thereon in an amount up to 100% by weight at most, preferably 10–50% by weight, relative to the weight of the individual molded pieces. It should be noted that, in case the amount of the applied water adhering to the surfaces of the molded pieces is in excess of 100% by weight, there will arise sticking between the individual molded pieces or deformation of the configuration of these pieces at the time of said further steaming, so that when these pieces as a product are immersed in hot water, their ability to transform into an edible state as well as their sense, feel and taste will become poor. As the means of applying water to the surfaces of the molded pieces, there may be performed spraying of water by means of a spray gun, or water may be sprinkled onto the molded pieces by a shower system, or the molded pieces may be immersed in water. Depending on the necessity, an aqueous emulsion of an edible oil, in place of water, may be used.

As stated, the application of water onto the surfaces of the molded pieces will cause more uniform progress of α-conversion at the time of said further steaming, so that there can be obtained dry macaroni products which are satisfactory in their ability of being rendered to an edible cooked condition when immersed in hot water and also satisfactory in their sense, feel and taste when eaten. The conditions of this further steaming are similar to those for the preliminary steaming.

In case the α-conversion degree of the molded pieces in said further steaming is lower than 90%, there will occur the mishap that, when the dry foods are immersed in hot water to be transformed to an edible state, there still remains the raw feeling as if of wheat flour, and this will hamper the desirable sense, feel and taste of the macaroni products when served.

It should be noted that the terms sense, feel and taste include the so-called "al-dente".

In case the molded pieces which have been subjected to a preliminary steaming are again subjected to a further steaming in order to enhance the instant cookability of the product, there will not occur any exudation of those starch components which are rendered to a glue-like state during this further steaming step, because in the preliminary steaming, α-conversion has made progress to a certain extent, which means that the starch components have changed to a glue-like state to a certain extent, and such portions of the starch components are enveloped in the reticular structure of the gluten contained in the material. Accordingly, there will arise no mutual sticking or agglutination between the individual molded pieces, and thus uniform α-conversion of the starch components is effected. Then, by drying the resulting molded pieces, it is possible to obtain instantly cookable dry macaroni having a uniform configuration and a fine porous texture which is formed as the water contained in the molded pieces is caused to evaporate by the heat applied during the drying step.

The conditions for the drying step are not definitely defined, since the conditions will depend on the temperature employed and also on the duration of this step. In case, however, there is no need to expand the molded pieces for the purpose of producing a porous texture, it is desirable to dry these molded pieces usually at a temperature of 55°–110° C. for 10–120 minutes. Also, in case there is the need to expand the steamed molded pieces during the drying step, it is desirable to dry these molded pieces usually at a temperature of 115°–150° C. for 3–20 minutes. In each instance, drying is continued until the water content of the molded pieces reaches 10% or less by weight relative to the weight of the molded pieces thus dried. The drying may be conducted by the use of heated air, or by heating the molded pieces with infrared ray irradiation, or heating by microwaves, and like heating either independently or in combination.

As stated, the instant-cooking dry macaroni products obtained according to the method of the present invention do not develop mutual sticking between individual pieces and do not develop deformation of the configuration of these pieces, and exhibit a uniform fine porous structure. Therefore, when they are to be served, the dry macaroni products can be easily transformed to an edible cooked state in a very short period of time, and give a satisfactory sense, feel and taste, and in addition they have the property to withstand stably the storage for an extended period of time. Thus, the products obtained according to the present invention have a high commercial value, and the present invention can be utilized for a wide range of purposes.

Description will hereunder be made on some preferred examples of the present invention. It should be understood that in these examples, the term "part" signifies a part by weight, and the term "%" means percent by weight. Evaluation of the sense, feel and taste of the macaroni products in their edible cooked state, the determination of α-conversion, and the rating of inter-piece sticking are conducted in the manner as stated below.

(1) Evaluation of sense, feel and taste 60 g of dry macaroni product pieces are placed in a heat-resistant cup, followed by pouring therein 200 cc of hot water at 95° C., and leaving them to stand for 5 minutes. At the end of 5 minutes, the resulting pieces of macaroni product are evaluated of their sense, feel and taste by a panel of 20 persons. The evaluation points are as follows: 10(very good); 8(good); 6(normal); 4(poor); and 2 (very poor). These points are shown by the mean values (decimals of over 0.5 inclusive are raised to the next higher number and the rest are ignored). The items relating to the evaluation of the pieces of macaroni product in their edible cooked state when eaten show the number of persons among the 20 person panel who indicate their feeling after eating the samples in their edible state.

(2) Degree of α-conversion (determined by diastase enzyme process)

More than 20 g of dried macaroni product are directly pulverized. Fine powders having a grain size of less than 100 mesh are used. In the measurement, 5 conical flasks of 100 ml are used with respect to one sample and these flasks are referred to as $A_1$–$A_4$ and B. 1.00 g of the above described adjusted sample is respectively weighed and placed in the $A_1$–$A_4$ flasks. The tolerance of the weighed amounts in the four flasks is made to be within ±5%. 50 ml of water is added to each of the five flasks and among them, $A_1$ and $A_2$ are heated and boiled for 15 minutes and then quenched to room temperature in ice water.

On the other hand, to $A_1$, $A_3$ and B is added 5 ml of 5% aqueous diastase solution respectively and all the 5 flasks are kept at 37° C.±1° C. for 90 minutes while shaking in a thermostat containing water, after which 2 ml of 1N HCl is added to all the flasks to stop the diastase reaction and the content in each flask is transferred into a 100 ml flask and water is added thereto 100 ml. Each solution is filtered by means of a dry filter paper, and from the filtrates obtained from the flasks $A_1$–$A_4$ and B, 10 ml of filtrate is fed into a conical flask with a ground stopper by a pipette, and said filtrates are referred to as $a_1$–$a_4$ and b.

In this stage, a conical flask with ground stopper containing 10 ml of water taken up by a pipette is prepared separately for a blank test. 10 ml of N/10 aqueous solution of iodine is added to each of a total of 6 flasks.

Then 18 ml of N/10 aqueous solution of sodium hydroxide is added to each of the 6 flasks one after another at a same time interval by means of a stop watch and the flask is corked and shaken and then left to stand precisely for 15 minutes. When the first flask has stood for 15 minutes, 2 ml of 10% sulfuric acid is added to the flask in the same order and the same interval as when N/10 aqueous solution of sodium hydroxide was first added, rapidly as soon as the stopper is opened, and these solutions are titrated with N/10 aqueous solution of sodium thiosulfate, and the titrated values of $a_1$–$a_4$ and b are referred to as $P_1$–$P_4$ and Q and the titrated value of the blank test is referred to as r. α-conversion degree (%) is determined by the following formula:

$$\alpha\text{-conversion degree} = \frac{(r - P_3) - (r - P_4) - (r - Q)}{(r - P_1) - (r - P_2) - (r - Q)} \times 100$$

(3) Rating of the degree of sticking between macaroni pieces 100 g of sample of uncooked macaroni pieces are taken at random, and the degree of mutual sticking between individual pieces are grossly observed.

EXAMPLE 1

To 500 parts of wheat flour was added a mixed solution of 150 parts of water and 10 parts of sodium chloride, and the mixture was thoroughly mixed in a mixer without causing kneading, to achieve even distribution of these substances in the mixture. Then, the resulting mixture was subjected to a preliminary steaming for 5 minutes at the gauge pressure of 1.0 Kg/cm². Thereafter, the mixture was extruded through a nozzle of an extrusion-molder to obtain molded pieces each having an outer diameter of 5.5 mm and a thickness of 0.7 mm. Then, the molded pieces were sprayed uniformly with water by a spray gun, to cause water to be carried on the surfaces of the molded pieces in an amount 30% relative to the original weight of the molded pieces. Thereafter, the resulting molded pieces were further steamed for 5 minutes at a gauge pressure of 1.0 kg/cm². Then, these molded pieces were dried by hot air at a temperature of 100° C. with an air speed of 15 m/sec until the water content of the molded pieces became 7%, and thus instant-cooking dry macaroni (the present invention) were obtained.

EXAMPLE 2

The procedure similar to Example 1 was carried out to obtain the instant-cooking dry macaroni (the present invention) excepting that the surfaces of the preliminarily steamed molded pieces were not applied with water.

CONTROL 1

The prodedure of Example 1 was carried out to obtain instant cooking dry macaroni (Control 1) by omitting the preliminary steaming step.

CONTROL 2

The procedure similar to Example 1 was carried out to obtain instant-cooking dry macaroni (Control 2) excepting that the preliminary steaming step was substituted by heating molded pieces with hot air (temperature: 100° C.; air speed: 3 m/sec; time: 2 minutes).

CONTROL 3

The procedure of Example 1 was carried out to obtain instant-cooking dry macaroni, excepting that the further steaming step was omitted.

Thereafter, evaluation of sense, feel and taste as well as rating of inter-piece sticking were determined of the instant-cooking dry macaroni obtained in Examples 1 and 2, and those obtained in Controls 1–3. The result is shown in Table 1.

TABLE 1

|  | Examples | | Controls | | |
|---|---|---|---|---|---|
|  | 1 | 2 | 1 | 2 | 3 |
| Degree of inter-piece sticking | none | none | very many | very many | none |
| Stick to teeth (No. of persons*) | 0 | 0 | 17 | 16 | 18 |
| Short of resiliency (No. of persons*) | 0 | 2 | 19 | 19 | 16 |
| Excessive resiliency (No. of persons*) | 0 | 0 | 0 | 0 | 1 |
| Short of smoothness (No. of persons*) | 0 | 1 | 7 | 3 | 7 |
| Excessively smooth (No. of persons*) | 0 | 0 | 0 | 6 | 2 |
| Too hard (No. of persons*) | 0 | 0 | 6 | 2 | 18 |
| Felt like raw wheat flour (No. of persons*) | 0 | 0 | 16 | 15 | 17 |
| Evaluation when eaten (points) | 10 | 8 | 3 | 4 | 2 |

*Out of 20 persons evaluating the samples

As is clear from the result shown above, Example 1 and 2 (the present invention) are superior to Controls 1–3 with respect to the degree of inter-piece sticking, the ability to transform to edible state when immersed in hot water, and the sense, feel and taste of the products.

Figure 2:
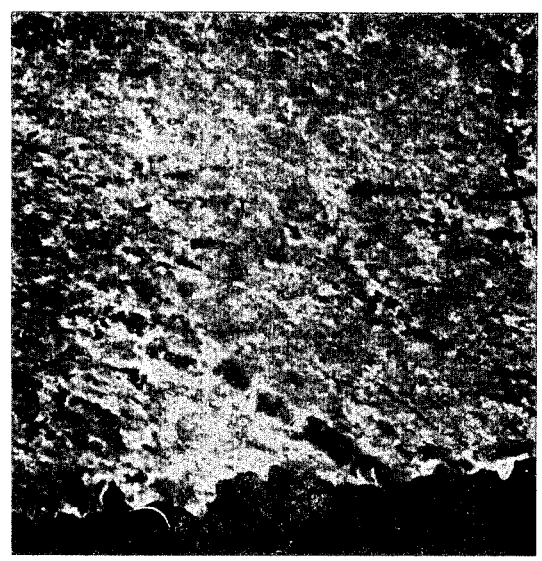
Figure 3:
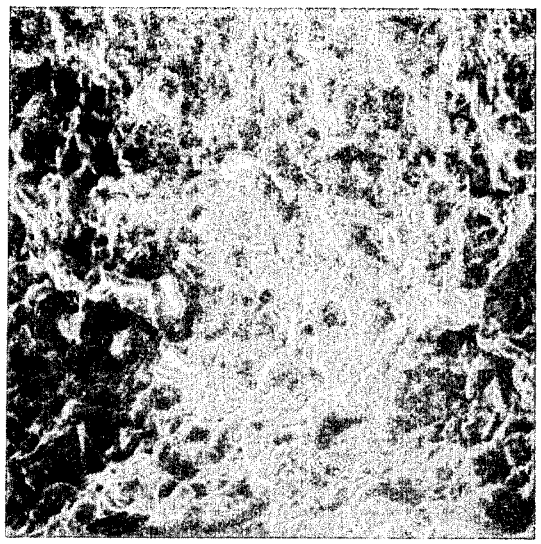
FIGS. 3 and 4 are electron microscopic photographs (magnification: 300 times) showing the external surface and cross section, respectively, of the control instant-cooking dry macaroni piece obtained in Control 1.
Figure 4:
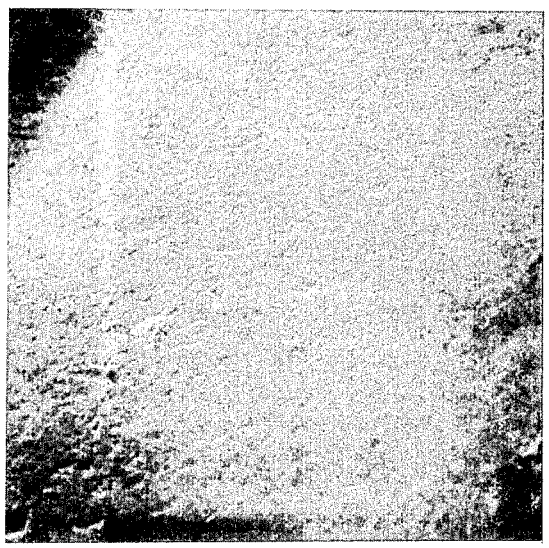

Also, as shown in FIGS. 1 to 4, when Example 1 (the present invention) is compared with Control 1, it has been found that Example 1 has a porous structure such that inter-communication is established between the outer surface and the inner surface of the product, as contrasted by Control 1 which shows that only the outer surface has a slightly porous structure.

EXAMPLE 3

The procedure similar to Example 1 was carried out to obtain instant-cooking dry macaroni excepting that the water content of the molded pieces prior to the second steaming step was changed as shown in the top line in Table 2. The result of test of the product obtained is shown in Table 2.

TABLE 2

|  | Present Invention | | | Control | |
|---|---|---|---|---|---|
| Water Content (%) | 25% | *30% | 35% | 20% | 45% |
| Degree of inter-piece sticking | none | none | none | none | very many |
| Stick to teeth (No. of persons) | 1 | 0 | 0 | 16 | 15 |
| Short of resiliency (No. of persons) | 0 | 0 | 0 | 11 | 1 |
| Excessive resiliency (No. of persons) | 0 | 0 | 1 | 0 | 3 |
| Short of smoothness (No. of persons) | 0 | 0 | 0 | 19 | 0 |
| Excessively smooth (No. of persons) | 0 | 0 | 0 | 0 | 10 |
| Too hard (No. of persons) | 0 | 0 | 2 | 20 | 6 |
| Felt like raw wheat flour (No. of persons) | 1 | 0 | 0 | 20 | 1 |
| Evaluation when eaten (points) | 9 | 10 | 8 | 2 | 4 |

Note: *equivalent to Example 1.

As is clear from the result shown above, it is necessary to set the water content of the mixture at 25–35% by weight, preferably 27–32% by weight.

EXAMPLE 4

The procedure of Example 1 was carried out to obtain instant-cooking dry macaroni except that the length of time of the preliminary steaming was varied to vary the α-conversion degree in the mixture as shown in the top line in Table 3. The result of test of the resulting respective products is shown in Table 3.

TABLE 3

|  | α-conversion degree after preliminary steaming | | | | |
|---|---|---|---|---|---|
|  | Present Invention | | | Control | |
|  | 60 | *70 | 80 | 50 | 90 |
| Degree of inter-piece sticking | none | none | none | very many | none |
| Stick to teeth (No. of persons) | 1 | 0 | 0 | 11 | 0 |
| Short of resiliency (No. of persons) | 0 | 0 | 0 | 6 | 0 |
| Excessive resiliency (No. of persons) | 0 | 0 | 0 | 0 | 18 |
| Short of smoothness (No. of persons) | 1 | 0 | 0 | 4 | 0 |
| Excessively smooth (No. of persons) | 0 | 0 | 0 | 0 | 3 |
| Too hard (No. of persons) | 0 | 0 | 1 | 0 | 6 |
| Felt like raw wheat flour (No. of persons) | 0 | 0 | 0 | 7 | 0 |
| Evaluation when eaten (points) | 9 | 10 | 9 | 3 | 5 |

Note: *equivalent to Example 1.

As will be apparent from the result shown above, the α-conversion degree after preliminary steaming needs to be 60% or more, preferably 70–80%.

EXAMPLE 5

The procedure of Example 1 was carried out to obtain spaghetti and vermicelli, excepting that the configuration of the nozzle of the extruder was changed, respectively. The result of test of these products is shown in Table 4.

TABLE 4

|  | Spaghetti | Vermicelli |
|---|---|---|
| Degree of inter-piece sticking | none | none |
| Stick to teeth (No. of persons) | 0 | 0 |
| Short of resiliency (No. of persons) | 0 | 0 |
| Excessive resiliency (No. of persons) | 0 | 0 |
| Short of smoothness (No. of persons) | 0 | 0 |
| Excessively smooth (No. of persons) | 0 | 0 |
| Too hard (No. of persons) | 0 | 0 |
| Felt like raw wheat flour (No. of persons) | 0 | 0 |
| Evaluation when eaten (points) | 10 | 10 |

Notes:
For spaghetti, a nozzle of bore diameter of 0.4mm was used.
For vermicelli, a nozzle of bore diameter of 0.9mm was used.

As will be clear from the results shown above, it has been found that these products are invariably good with respect to inter-piece sticking, ability to transform into an edible state when immersed in hot water, and sense, feel and taste, and that they invariably attain the object of the present invention.

What is claimed is:

1. A method of manufacturing instant-cooking dry macaroni products, comprising the steps of:
    (a) preparing a mixture containing from 25 to 35% by weight of water by mixing, with substantially no kneading, a starting material consisting essentially of a starch-containing component selected from wheat flour and wheat flour with other grain powders, starch or both and of water; then (b) subjecting the mixture of step (a) to a preliminary steaming step until said starch attains an α-conversion degree of from 60% to 80% as measured by the diastase enzyme process; then (c) shaping the resulting material into individual molded pieces of a desired configuration; thereafter (d) subjecting the molded pieces to a further steaming step until said starch attains an α-conversion degree of at least 90%; and then (e) drying the steamed, molded pieces of step (d) until the water content of the molded pieces is reduced to at most 10% by weight relative to the weight of the molded pieces thus dried.

2. A method according to claim 1, in which said shaping step includes extruding said mixture through an extruder.

3. A method according to claim 1, further comprising the step of applying water to the surfaces of the preliminarily steamed and molded pieces before subjecting them to said further steaming of step (d).

4. A method according to claim 1, further including the step of granulating the mixture of step (a) after thorough mixing.

5. A method according to claim 3, in which said application of water causes said surfaces of said molded pieces to carry water thereon in an amount not exceeding 100% by weight relative to the weight of said molded pieces.

6. A method according to claim 1, further comprising applying an emulsion of an edible oil to the surfaces of the preliminarily steamed and molded pieces before subjecting them to said further steaming of step (d).

7. A method according to claim 3, in which said water is applied by spraying water through a spray gun; subjecting the molded pieces to a shower system; or immersing the molded pieces in water.

8. A method according to claim 6, in which said emulsion is applied by spraying said emulsion through a spray gun; subjecting the molded pieces to a shower system; or immersing the molded pieces in said emulsion.

9. A method according to claim 1, in which said mixture prepared in step (a) contains sodium chloride in an amount not exceeding 8.0% by weight relative to the weight of said starch-containing component before steaming.

10. A method according to claim 1, in which said preliminary steaming of step (b) is conducted at a gauge pressure of 0.5–1.5 kg/cm² for 2–5 minutes.

11. A method according to claim 1, in which said further steaming of step (d) is conducted at a gauge pressure of 0.5–1.5 kg/cm² for 2–5 minutes.

12. A method according to claim 1, in which said drying of step (e) is performed at a temperature of 55° C.–150° C. for 3–120 minutes.

13. A method according to claim 1, in which said drying is carried out by hot air heating, infrared heating, microwave heating, or combinations thereof.

14. Instant-cooking dry macaroni products having a water content of 10% or less by weight, consisting essentially of at least one starch-containing component selected from wheat flour and wheat flour with other grain powders, starches or both, the starch contained therein having an α-conversion degree of at least 90% as measured by a diastase enzyme process, said products having a fine porous texture providing communication between the external surfaces of said products with the interior portions thereof by a network of fine pores, and being capable of transformation into an edible cooked state within a short period of time when immersed in hot water, said products being sufficiently durable to withstand storage for a period of time of at lest one year without substantial change in quality, devoid of portions sticking to adjacent pieces of said products, and yielding a non-sticky good sense, feel and taste when transformed to said edible cooked state and produced by the method of claim 6.

15. Instant-cooking dry macaroni products according to claim 14, in which said products contain sodium chloride in an amount not exceeding 8.0% by weight relative to the weight of said starch-containing component.

16. Instant-cooking dry macaroni products according to claim 14, in which said products contain an effective amount of at least one of a food-quality improving agent, a seasoning agent, and a viscous binding agent.

17. Instant-cooking dry macaroni products according to claim 1, in which: said wheat flour consists of Semolina flour of Durum Wheat family.

18. Instant-cooking dry macaroni products according to claim 16, in which said food-improving agent is selected from the group consisting of di-sodium phosphate, glycerin fatty acid ester, sucrose fatty acid ester, sorbitan fatty acid ester, lecithin, propylene glycol, D-sorbitol, sodium starch phosphate, sodium caseinate, L-lysine hydro-chloride, vitamin $B_1$, vitamin $B_2$, chlorella, active gluten, and combinations thereof.

19. Instant-cooking dry macaroni products according to claim 16, in which said viscous binding agent is selected from the group consisting of egg yolk, water-soluble gums, cellulose sodium glycolate, sodium polyacrylate, sodium alginate and combinations thereof.

20. Instant-cooking dry macaroni products according to claim 16, in which said seasoning agent is selected from the group consisting of spices, extracts, sodium glutaminate, sodium inosinate, guanylic acid, succinic acid, and combinations thereof.

* * * * *